W. S. BURKE.
MEANS FOR UTILIZING ELECTRICITY.
APPLICATION FILED JULY 1, 1912.
1,257,801.
Patented Feb. 26, 1918.
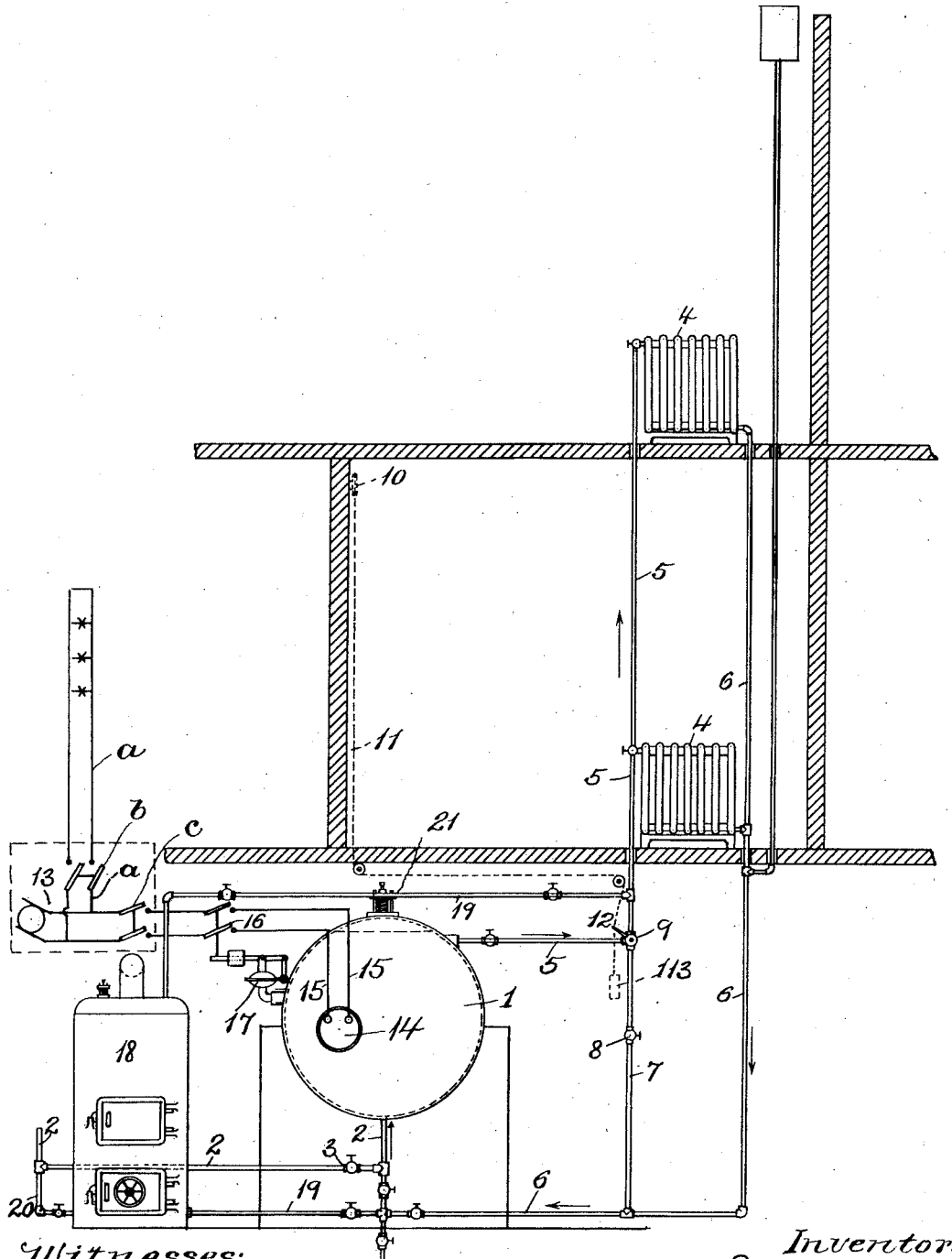

UNITED STATES PATENT OFFICE.

WALTER S. BURKE, OF CAMBRIDGE, MASSACHUSETTS.

MEANS FOR UTILIZING ELECTRICITY.

1,257,801.      Specification of Letters Patent.      Patented Feb. 26, 1918.

Application filed July 1, 1912. Serial No. 706,872.

*To all whom it may concern:*

Be it known that I, WALTER S. BURKE, a citizen of the United States, and resident of Cambridge, in the county of Middlesex and State of Massachusetts, have invented certain new and useful Improvements in Means for Utilizing Electricity, of which the following is a specification.

In the production of electricity by water power, the cost to the consumer is increased owing to the fact that, except in relatively isolated cases, the demand varies during the twenty-four hours of the day. In many instances, the load is reduced to a minimum during a portion of the night, and as a result much of the power in water power plants is wasted.

In steam power plants, the same is true to a less extent, but in both cases the cost to the consumer could be reduced if it were possible to utilize the electrical current during the entire day of twenty-four hours.

It is the object of the present invention to provide a system in which the electrical current may be utilized when it is not in demand, as during the hours of the night. In accomplishing this object, I also have in view to greatly reduce the cost of heating dwelling houses, schools and other buildings, by converting the electrical energy into heat and storing the heat, and thus avoiding the use of coal furnaces with their attendant disadvantages.

In carrying out the invention, I propose to employ a storage tank capable of holding a large quantity of water, so that from the tank hot water may be supplied to a radiator system suitably connected therewith. The water in the tank is heated by one or more suitable electrical heaters or heating units, to which current is supplied from the main power plant, when the current is not being otherwise used. At night and at other times when the load is light, the current will be supplied to the circuit including the storage-tank heating units, so that the electrical energy will be converted into heat and sufficient heat will be stored to enable the radiators to be supplied with hot water for a relatively long time, or until the water in the tanks is again heated.

On the accompanying drawing,—I have illustrated diagrammatically a system embodying the invention, in which 1 indicates a hot water storage tank properly insulated to prevent, so far as possible, the escape of heat. Water is supplied to the tank by the main supply pipe 2, which is valved as at 3. A hot water radiator system is conventionally illustrated as comprising radiators 4 4, a supply pipe 5, and a return pipe 6, connected to the main supply pipe 2 so as to return the water to the storage tank 1. Between the pipes 5 and 6 is a by-pass 7, valved as at 8, there being at the junction of the by-pass pipe 7 and the pipe 5 a mixing valve 9, so that a portion of the water returning from the heating system may be caused to mix with the water from the storage tank, the remainder of the return water being delivered to the storage tank. The mixing valve is preferably automatically controlled by a thermostat 10 (which may be clock-regulated if desired), any suitable form of operating device being employed in connection therewith. As conventionally shown, a flexible connection 11 extends from the thermostat to an arm 12 on the mixing valve and to a weight 113. The mixing valve is preferably so arranged that it cannot stop the entire flow from the storage tank, but always permits a small flow sufficient to prevent the radiators from freezing in very cold weather.

The electrical system includes a generator 13, the current from which is utilized for various purposes during a portion of the twenty-four hours of the day. A working circuit is shown at $a$, and includes a switch $b$. At 14 I have indicated the electrical heating elements which are located in the storage tank and which may be of any approved form or kind. They are arranged in a circuit which includes the conductors 15, and a switch 16, the latter being controlled by a diaphragm regulator 17 or other form of controlling device, so constructed and arranged that, when the pressure or temperature in the tank reaches a predetermined maximum, the switch will be automatically operated to cut out the heating element, and, when the pressure or temperature reaches a predetermined minimum, the heating element will be cut in again. By the regulator 17, I prevent an excessive pressure in the storage tank and radiator or heating system and prevent a use of the current when it is not needed. The circuit of course includes a switch $b$ located at the power station or at any suitable point so that current may be supplied to the circuit 15 when other use for the current has temporarily ceased.

In case it should happen for any cause that the supply of current is unavailable for a time, I propose to employ an auxiliary heater 18 (coal, oil or gas), the delivery pipe 19 from which is connected with the supply pipe 5 of the radiator system. The return water from the latter is delivered to the heater by the pipe 19, and water is initially supplied to the heater by a branch pipe 20 leading from the main supply pipe 2. The various pipes are of course provided with such valves as may be necessary to cut in or out the auxiliary heater.

From the foregoing description, it will be apparent that the tank 1 is primarily of large capacity for the storage of hot water, and that, when there is an excess of current, it will be supplied to the electrical heating circuit, the capacity of the tank being such that the water thus heated will be available for many hours for the hot water distributing or radiator system. In this connection, the mixing valve plays a relatively important part, as it prevents to a great extent the chilling of the entire body of water in the tank and permits the withdrawal from the tank of only enough water to maintain the rooms at the desired temperatures.

Ordinarily the tank will be substantially nine-tenths filled with water, with the air pressure on the water, when the latter is cold, sufficient to force the water to the highest point necessary in the radiator system. Any arrangement of the radiator system may be employed however. In any event, I prefer to employ a safety valve 21 to prevent excessive pressure in the tank from any cause.

It will be noted that while the electrical heating element may be energized when desirable from the central power plant, yet the switch 16 will be opened or closed automatically so that the current will not be used save when it is needed. Ordinarily the circuit will be opened when the pressure or temperature reaches, say, 20 pounds or about 260° F., and will be closed when they have fallen to, say, 5 pounds or 228° F. On the other hand, the power house operator can turn on or turn off the current at his own convenience without interfering with the operation of the hot water heating system. The heat losses may be reduced as suggested by the proper use of insulating material for the tank and the various pipes, and may be utilized in indirect heating.

Having thus explained the nature of my said invention and described a way of constructing and using the same, although without attempting to set forth all of the forms in which it may be made or all of the modes of its use, what I claim is:

1. The combination with a tank for receiving and storing hot water, and an electric circuit including an electric heater for heating said water, of a hot water radiator system connected with said tank, means for opening and closing said circuit, a mixing valve in said system controlling the flow of water from said tank and the return water into said system, and remote-control means for operating said mixing valve.

2. The combination with a tank for receiving and storing hot water, and an electric circuit including an electric heater for heating said water, of a hot water radiator system connected with said tank, an automatic regulator connected with said tank for opening and closing said circuit, a mixing valve in said system controlling the flow of water from said tank and the return water into said system, and a temperature regulated controller for said mixing valve.

In testimony whereof I have affixed my signature in presence of two witnesses.

WALTER S. BURKE.

Witnesses:
M. B. MAY,
P. W. PEZZETTI.